US012794691B2

(12) United States Patent
Liu et al.

(10) Patent No.: US 12,794,691 B2
(45) Date of Patent: Nov. 10, 2026

(54) MULTI-PARTY COMPUTATION FRAMEWORK BASED ON TRUSTED EXECUTION ENVIRONMENT

(71) Applicant: Dell Products L.P., Round Rock, TX (US)

(72) Inventors: Jinpeng Liu, Shanghai (CN); Zhen Jia, Shanghai (CN); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 613 days.

(21) Appl. No.: 17/829,485

(22) Filed: Jun. 1, 2022

(65) Prior Publication Data

US 2023/0396434 A1 Dec. 7, 2023

(51) Int. Cl.

*H04L 9/14* (2006.01)
*H04L 9/32* (2006.01)
*H04L 41/0893* (2022.01)

(52) U.S. Cl.

CPC .............. *H04L 9/14* (2013.01); *H04L 9/3215* (2013.01); *H04L 41/0893* (2013.01); *H04L 2209/46* (2013.01)

(58) Field of Classification Search

CPC ........ H04L 2209/46; H04L 9/14; H04L 67/14
See application file for complete search history.

(56) References Cited

U.S. PATENT DOCUMENTS 7,310,730 B1 * 12/2007 Champagne ........ H04L 63/0428 713/153
9,577,829 B1 * 2/2017 Roth ........................ G06F 21/60
2013/0152153 A1 * 6/2013 Weiser ................ H04L 65/1069 726/1
2018/0150411 A1 * 5/2018 Kou .................... G06F 12/1408

(Continued)

OTHER PUBLICATIONS

Ferdinand Brasser; Kasper B. Rasmussen; Ahmad-Reza Sadeghi; and Gene Tsudik, Remote attestation for low-end embedded devices: the prover's perspective, 2016, Association for Computing Machinery, Proceedings of the 53rd Annual Design Automation Conference (DAC '16).*

(Continued)

*Primary Examiner* — Ayoub Alata
(74) *Attorney, Agent, or Firm* — Ryan, Mason & Lewis, LLP

(57) ABSTRACT

Techniques for integrating a trusted execution platform with a multi-party computation framework are disclosed. For example, a method comprises receiving a plurality of keys from a plurality of parties, wherein respective ones of the plurality of keys correspond to respective ones of the plurality of parties. The respective ones of the plurality of keys are used in connection with establishing one or more secure channels for communicating with the respective ones of the plurality of parties. The method further comprises receiving respective data inputs from the respective ones of the plurality of parties over the one or more secure channels, and sending the respective data inputs to a computation function to compute at least one output based on the respec- (Continued)

tive data inputs. The at least one output is sent over the one or more secure channels to at least one party of the plurality of parties.

20 Claims, 4 Drawing Sheets

(56) References Cited

U.S. PATENT DOCUMENTS

2021/0248253 A1* 8/2021 Fuhry ..................... G06F 21/53
2024/0152641 A1* 5/2024 Mehta ....................... H04L 9/08

OTHER PUBLICATIONS

Github, "Open Enclave SDK," https://openenclave.io/sdk/, Accessed Apr. 21, 2022, 3 pages.
Github, "Asylo," https://github.com/google/asylo, Accessed Apr. 21, 2022, 8 pages.
Wikipedia, "Call Stack," https://en.wikipedia.org/wiki/Call_stack, Mar. 22, 2022, 8 pages.
Wikipedia, "Homomorphic Encryption," https://en.wikipedia.org/wiki/Homomorphic_encryption, May 2, 2022, 12 pages.
Wikipedia, "Trusted Computing Base," https://en.wikipedia.org/wiki/Trusted_computing_base, Jan. 13, 2021, 4 pages.
U.S. Appl. No. 17/459,705 filed in the name of Jinpeng Liu et al. filed Aug. 27, 2021, and entitled "Function-Based Service Framework with Trusted Execution Platform."

* cited by examiner

100

MULTI-PARTY COMPUTATION FRAMEWORK BASED ON TRUSTED EXECUTION ENVIRONMENT

FIELD

The field relates generally to information processing systems, and more particularly to data protection in such information processing systems.

BACKGROUND

Sensitive data such as, for example, financial information, medical information and other private information, is used in multiple computing applications, and must be protected from access by unauthorized parties. For example, financial information in credit applications, medical history data in insurance applications, and business data in enterprise applications require safeguards that prevent the data from unwanted exposure.

Multi-party computation (MPC) is a cryptographic tool that enables calculations using the combined data of multiple parties without revealing the data inputs to the parties. Currently, MPC techniques employ homomorphic encryption and secret sharing circuits. The large volume and depth of homomorphic encryption circuits uses significant amounts of computing resources. In addition, secret sharing circuits require numerous small-sized data packet exchanges across a network, resulting in poor performance. Due to their limitations, homomorphic encryption and secret sharing circuit techniques are not practical for use in wide area network (WAN) based computing environments, such as cloud or edge computing environments.

SUMMARY

Illustrative embodiments provide techniques for integrating a trusted execution platform with a multi-party computation framework.

For example, a method comprises receiving a plurality of keys from a plurality of parties, wherein respective ones of the plurality of keys correspond to respective ones of the plurality of parties. The respective ones of the plurality of keys are used in connection with establishing one or more secure channels for communicating with the respective ones of the plurality of parties. The method further comprises receiving respective data inputs from the respective ones of the plurality of parties over the one or more secure channels, and sending the respective data inputs to a computation function to compute at least one output based on the respective data inputs. The at least one output is sent over the one or more secure channels to at least one party of the plurality of parties.

These and other features and advantages of embodiments described herein will become more apparent from the accompanying drawings and the following detailed description.

DETAILED DESCRIPTION

Figure 1:
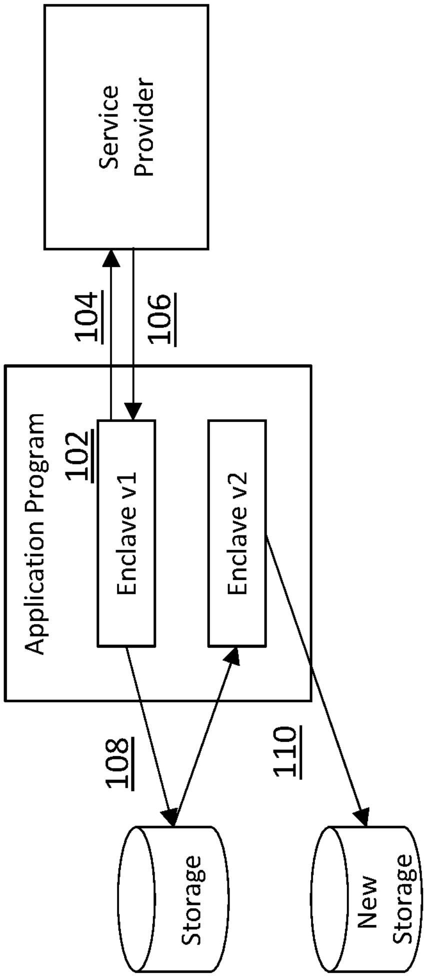
FIG. 1 illustrates an exemplary workflow in an application execution environment with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." Other definitions, either explicit or implicit, may be included below.

MPC uses cryptography and a protocol to simulate a trusted third party to execute a pre-defined computation based on inputs from parties, while keeping the input(s) from another party private from a given party. For example, assuming two parties A and B own the inputs x and y, respectively, and want to compute if x>y. An MPC input protocol will compute the Boolean expression x>y and return the resulting output value to A and B without revealing y to A and x to B. With the advent of cloud and outsource computing MPC may be applied to various application program execution scenarios including, but not limited to, electronic voting, private DNA matching, privacy-preserving network monitoring, secure machine learning and federated learning. With conventional approaches, MPC protocols can be implemented using, for example, garbled circuits, linear secret sharing, homomorphic encryption and homomorphic secret sharing. As mentioned, current MPC techniques are not practical for use in WAN based computing environments since they use significant amounts of computing resources, and require numerous small-sized data packet exchanges across a network, resulting in poor performance.

Trusted execution platforms can be used by applications to protect user code and data. One example of a trusted execution platform is the Software Guard Extension (SGX) Trusted Execution Environment (TEE) hardware platform available from Intel Corporation, which can be used by applications to populate protected user code and data inside trusted environments. Once activated, the trusted hardware platform protects enclave code and data from outside access and modification. Other examples of TEE implementations include, for example, AMD SEV (Secure Encrypted Virtualization) available from Advanced Micro Devices, Inc. (AMD), and ARM Trustzone available from Arm Ltd.

TEEs provide enclave computing environments to protect code and data from access and modification by unauthorized parties. TEEs further provide attestation, provisioning and sealing services to assure customers that their computing is executed in a trusted platform and their software has not been tampered with, nor has any sensitive information been leaked.

To address the drawbacks of current MPC techniques, illustrative embodiments provide technical solutions that integrate a TEE-based solution into an MPC framework.

Although some embodiments are described in connection with an SGX TEE platform, it is to be appreciated that illustrative embodiments are not limited to implementation with the SGX TEE platform but rather are more generally applicable to other trusted execution platforms and cloud computing paradigms.

The TEE platform has hardware-assisted functionality to provide a trusted execution environment used by applications to populate protected user code and data inside "enclaves" or trusted execution areas. Once activated, the trusted hardware platform protects enclave code and data from outside access and modification. More particularly, an enclave is used to protect code and/or data from access and modification by other parties, for example, the operating system/hypervisor itself or other applications.

Furthermore, the TEE platform utilizes an attestation service that authenticates software provided by the customer to be loaded into the enclave. The attestation service attempts to ensure that the lower layer hardware platform can be trusted, for example, that the central processing unit (CPU) is a genuine product manufactured by a given vendor and that the firmware and microcode is secure without being tampered with by a malicious third-party. Further, the attestation service attempts to ensure application software (code/data) can be trusted, i.e., that code/data of the software has not been tampered with or modified by other malicious parties. Still further, the attestation service attempts to ensure that the software installation process can be trusted, i.e., the software is installed onto the platform exactly as defined without being changed or tampered with by other malicious parties. When these three aspects can be trusted, the customer will be assured that their applications are secure and cannot be exploited.

Still further, the TEE platform utilizes a provisioning service to provide confidentiality to the software by provisioning secrets and sensitive data to the enclave during runtime. After the software is attested (authenticated) by the customer, the customer can be assured that everything about the application, hardware and software, is secured, and they can then provision their secrets and sensitive data to the application running inside the enclave. Other services such as sealing, migration, and revocation construct a closed loop to consolidate the security of the application running inside the enclave.

FIG. 1 illustrates an exemplary enclave-based TEE platform workflow 100. As shown, in step 102, the TEE platform installs an enclave (enclave v1) and measures the code/data contents and the installation process. In step 104, enclave v1 is remote attested by the data owner service provider and, in step 106, the data owner service provider provisions data to the attested enclave (enclave v1). In step 108, the enclave seals (stores) the data for future usage. The data is encrypted with a key unique to the TEE platform and enclave. After a security upgrade, a new enclave (enclave v2) reads the encrypted data back and seals (stores) the data with a new key in step 110. It is evident from FIG. 1 that, because the software (code and data) is loaded into the enclave in the enclave initialization process, the enclave can only provide authenticity of the software, but not confidentiality. To achieve confidentiality, the data must be provisioned during runtime (step 106) after attestation (step 104) by the customer via a secure channel established with the keys created during the attestation process (not expressly shown in FIG. 1). Further note that the data cannot be built into the enclave software statically, but are provided by the service provider during runtime dynamically. Existing enclave-based TEE software development kits (SDKs) (e.g., Open Enclave SDK available from Microsoft Corporation and Asylo available from Google LLC) encourage the customers to develop their secure applications in their confidential computing environments in Azure or Google Cloud. However, existing enclave-based TEE SDKs are application programming interface (API) oriented and not configured for an MPC framework. As a result, it is difficult for users to develop MPC applications using the existing enclave-based TEE SDKs.

Figure 2:
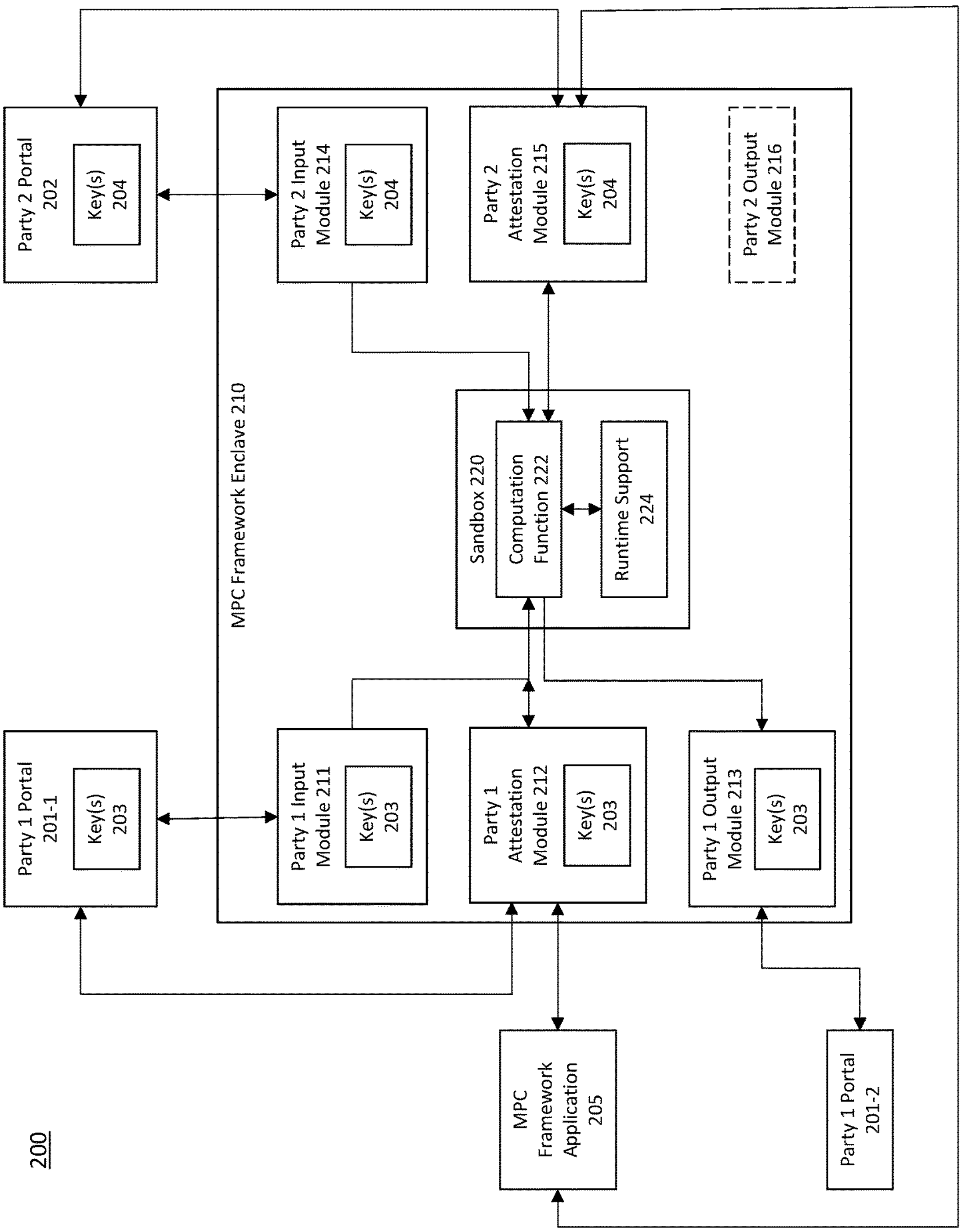
FIG. 2 illustrates integration of a trusted execution platform with an MPC framework according to an illustrative embodiment.

FIG. 2 illustrates an architecture 200 for the integration of a trusted execution platform with an MPC framework according to an illustrative embodiment. The architecture 200 comprises an MPC framework application 205 (also referred to herein as an "untrusted part") and an MPC framework enclave 210 (also referred to herein as a "trusted part"). In accordance with illustrative embodiments, the functions that comprise a given application program are split into trusted and untrusted parts. It is realized that to put the entire application and all its functions into an enclave and then try to harden the security boundary is not practical and bad practice as unnecessary codebase inside the enclave attempting to communicate to the outside world will expose the inside vulnerabilities to an attacker to be exploited. Rather, illustrative embodiments distinguish functions of the application into the trusted part (e.g., security-sensitive data/logic) and an untrusted part (e.g., security insensitive data/logic).

The architecture 200 assumes that there are two parties, Party 1 and Party 2. However, the embodiments are not limited thereto, and there may be less or more than two parties. As used herein, the terms "party" or "parties," and similarly, the terms "client(s)," "customer(s)" or "user(s)" are intended to be broadly construed so as to encompass numerous arrangements of human, hardware, software or firmware entities, as well as combinations of such entities. In some situations, parties or a party may include client(s), customer(s) or user(s) and vice versa.

The architecture 200 further comprises portals for each party. For example, the architecture 200 includes party 1 portals 201-1 and 201-2 (collectively "party 1 portals 201") and party 2 portal 202. The party 1 and party 2 portals 201 and 202, which may be accessible via one or more uniform resource locators (URLs) (e.g., www.p1.com and www.p2.com), as well as client, customer or user devices can comprise, for example, Internet of Things (IoT) devices, desktop, laptop or tablet computers, mobile telephones, or other types of processing devices capable of communicating with the MPC framework application 205 and/or the MPC framework enclave 210 over a telecommunications network as described further herein in connection with FIG. 4 and elsewhere. Such devices are examples of what are more generally referred to herein as "processing devices." Some of these processing devices are also generally referred to herein as "computers." The party 1 and party 2 portals 201 and 202 and/or client, customer or user devices may also or alternately comprise virtualized computing resources, such as virtual machines (VMs), containers, etc. The party 1 and party 2 portals 201 and 202 and/or client, customer or user devices in some embodiments comprise respective computers associated with a particular company, organization or other enterprise. Although two party 1 portals 201 and one party 2 portal 202 are shown, the embodiments are not necessarily limited thereto, and more or less party 1 and party 2 portals 201 and 202 may be part of the architecture 200.

As noted above, the MPC framework application 205 is also referred to as an untrusted part, which is outside of the MPC framework enclave 210, and MPC framework enclave 210 comprises the trusted part. The MPC framework application 205 (untrusted part) creates the MPC framework enclave 210 with the code/data provided by a customer. The customer may be, for example, an entity such as a service provider, distinct from the party 1 and party 2. Alternatively, the customer may be one of the parties 1 and 2 or affiliated with the parties 1 and 2. As can be seen in FIG. 2, the MPC framework enclave 210 is created with a sandbox 220 (e.g., toolkit) comprising a computation function 222 and a runtime support environment 224 for the execution of the computation function 222. In some embodiments, the runtime support environment 224 is generated by porting code from an open source project. For example, SCONE is an open source solution that may be used to provide a secure container based on SGX, which implements supports to run different Docker applications in C, JavaScript, Python, etc. computing environments.

In illustrative embodiments, the MPC framework application 205 (e.g., untrusted part) builds the MPC framework enclave 210 based on an application configuration, which is, for example, provided by a customer. The configuration settings specify, for example, (i) the number and identity of the parties for the architecture; (ii) the environment in which the enclave (e.g., MPC framework enclave 210) will execute (e.g., C, JavaScript, Python, etc.); (iii) an identification of a location from where each party will attest the enclave (e.g., URL or other unique identifying information); (iv) an identification of the party or parties providing input data to the enclave (e.g., to the computation function); and (v) an identification of the party or parties receiving output data from the enclave (e.g., from the computation function). For example, in the non-limiting operational example comprising the architecture 200, the configuration settings specified: (i) inclusion of party 1 and party 2; (ii) a C language environment; (iii) that party 1 and party 2 will attest the MPC framework enclave 210 from party 1 portal 201-1 (www.p1.com) and party 2 portal 202 (www.p2.com); (iv) that party 1 will send input data to the MPC framework enclave 210 from party 1 portal 201-1 (www.p1.com) and party 2 will send input data to the MPC framework enclave 210 from party 2 portal 202 (www.p2.com); and (v) that party 1 will receive output data from the MPC framework enclave 210 at party 1 portal 201-2 (e.g., www.p1-output-.com), while party 2 will not receive any output from the MPC framework enclave 210. As can be understood, the input source can be different from the output destination for a given party. Alternatively, the input source and the output destination for a given party can be the same. In the example architecture 200, party 2 is exclusively a provider of input data, and does not receive output from the MPC framework enclave 210. The embodiments are not necessarily limited to the configurations of the architecture 200. For example, in other scenarios, there may be more or less than two parties, each party may provide an input and receive an output, some parties may not necessarily provide an input, etc.

Based on the configuration settings, the generated MPC framework enclave 210 comprises a party 1 input module 211, a party 1 attestation module 212, a party 1 output module 213, a party 2 input module 214 and a party 2 attestation module 215. A party 2 output module 216 is shown with broken lines for illustrative purposes to indicate that a party 2 output module 216 would be generated if the configuration settings specified that party 2 was to receive an output.

In illustrative embodiments, the MPC framework application 205 (e.g., untrusted part) further builds the MPC framework enclave 210 based on a computation function, which is, for example, provided by a customer. The customer provides the specification of this computation function. The specification may indicate, for example, the data types and sizes of the inputs and outputs, the type of data input (if any) from each respective party, as well as the types of output (if any) to be sent to each respective party. The specification includes any algorithms performed on the data (e.g., determining relationships between the data (e.g., whether x>y), or performing some other operation such as, but not necessarily limited to, determining ranking, trends, averages, percentages or other conclusions from the data. The computation function 222 performs a defined computation based on input data from parties, while the MPC framework enclave 210 keeps the input(s) from another party private from a given party. The MPC framework application 205 creates a call from the MPC framework enclave 210 into the computation function 222. The call is created with, for example, one or more call gates.

The computation function 222 is executed in the sandbox 220, such that input-output (IO) operations are not performed in the sandbox 220. In other words, IO operations are not performed by the computation function 222 or by the runtime support environment 224. The runtime support environment 224 provides a limited support library that is accessible by the computation function 222. The runtime support environment 224 provides support for data processing, but not for performance of IO operations. The IO operations (e.g., receipt of the input data from the parties (e.g., from party 1 and party 2) needed by the computation function 222 and transmission of output data to the parties (e.g., party 1) from the computation function 222) are performed by the input and output modules (e.g., party 1 input module 211, party 1 output module 213 and party 2 input module 214). For example, the party 1 input module 211 receives input data from the party 1 portal 201-1, the party 2 input module 214 receives input data from the party 2 portal 202, and the party 1 output module 213 sends the output data to the party 1 portal 201-2. The computation function 222 is dedicated to data processing, and does not perform IO operations.

According to one or more embodiments, every function executed inside the MPC framework enclave 210, including functions performed in the sandbox 220 require a function call stack to track active subroutines. By monitoring the call stacks, the MPC framework enclave 210 will know if any IO operations have been performed by the computation function 222. If the MPC framework enclave 210 determines that IO operations have been performed by the computation function 222, the MPC framework enclave 210 will take remedial action (e.g., modify computation function and/or runtime support code) to prevent such IO operations.

In illustrative embodiments, the MPC framework application 205 (e.g., untrusted part) initializes a remote attestation process to each party by providing the hardware/environment (e.g., C language environment) signature to the party 1 and party 2 attestation modules 212 and 215. Similar to the IO operations, attestation operations are not performed in the sandbox 220, and are performed using the party 1 and party 2 attestation modules 212 and 215 to process remote attestations of the MPC framework enclave 210 from party 1 and party 2.

Following attestation by the parties (e.g., party 1 and party 2), the parties provide input/output data encryption/decryption keys to the MPC framework enclave 210. For example, party 1 provides one or more keys 203 corresponding to party 1 to the party 1 input module 211, party 1 attestation module 212 and party 1 output module 213. The keys 203 can be provided via, for example, the party 1 portals 201. Party 2 provides one or more keys 204 corresponding to party 2 to the party 2 input module 214 and party 2 attestation module 215. A key is not provided to a party 2 output module 216 unless party 2 is designated to receive an output from the computation function 222 and party 2 output module 216 has been generated. The keys 204 can be provided via, for example, the party 2 portal 202. Keys corresponding to a first party (e.g., keys 203) are invisible to a second party (e.g., party 2), and vice versa (e.g., keys 204 are invisible to party 1). In other words, each party has no knowledge of another party's keys. In addition, the keys from different parties are visible to the enclave (e.g., MPC framework enclave 210), but are not visible to external platform owners (for example, the cloud service providers) that may be providing services to the parties.

The keys 203 and 204 are stored in the modules 211, 212, 213, 214 and 215. The storage of the keys 203 and 204 can be verified by the different parties (e.g., party 1 and party 2) via remote attestation. According to one or more embodiments, the keys for each party are symmetric (e.g., the same for encryption and decryption). Alternatively, the encryption and decryption keys for each party are different. The keys for input and output data can be the same or different for each party, depending on the application. For example, if output data is written into a database different from a database where the input data originates, different keys are used for accessing the different databases.

Using the different keys provided by the different parties (e.g., keys 203 and 204), the MPC framework enclave 210 establishes secure communication channels between all input sources and input modules and all output recipients and output modules. For example, using input keys of the keys 203, a secure communication channel is established between party 1 portal 201-1 and party 1 input module 211. Similarly, using input keys of the keys 204, a secure communication channel is established between party 2 portal 202 and party 2 input module 214. Using output keys of the keys 203, a secure communication channel is established between party 1 portal 201-2 and party 1 output module 213. One or more of the keys 203 are used to establish secure connections between the party 1 portal 201-1 and party 1 attestation module 212, and one or more of the keys 204 are used to establish secure connections between the party 1 portal 201-1 and party 1 attestation module 212. The secure connections utilize, for example, SSL (Secure Socket Layer) and/or TLS (Transport Layer Security) protocols.

As noted herein above, the input and output modules (e.g., input modules 211 and 214, and output module 213) perform the IO operations so that the components in the sandbox 220 (e.g., computation function 222 and runtime support environment 224) do not perform IO operations. Following receipt of input data from the party 1 portal 201-1 over a secure channel, the party 1 input module 211 uses a decryption key of the keys 203 to decrypt the input data, which was encrypted at the party 1 portal 201-1 using an encryption key of the keys 203. Following receipt of input data from the party 2 portal 202 over a secure channel, the party 2 input module 214 uses a decryption key of the keys 204 to decrypt the input data, which was encrypted at the party 2 portal 202 using an encryption key of the keys 204. After decryption, the decrypted input data from the different parties (e.g., party 1 and party 2) is transmitted to the computation function 222 from the party 1 and party 2 input modules 211 and 214.

After the computation by the computation function 222, the output from the computation function 222 is sent to a callee function in the MPC framework enclave 210, and the party 1 output module 213 encrypts the output using an encryption key of the keys 203, and sends the encrypted output to the party 1 portal 201-2 over a secure channel, as specified by the configuration settings. Since there is no specified output for party 2 in the configuration settings, an output of the computation function 222 is not sent to party 2. The computation function 222 computes the output without knowing sources of the respective data inputs and recipients of the output.

Advantageously, by incorporating features of a TEE implementation, the security of the MPC framework enclave 210 is ensured. For example, with remote attestation, all parties can ensure that the MPC framework enclave 210 is secure and is not tampered with by third parties. In addition, the TEE implementation provides assurance that the computation function 222 is the same as the computing function specified by the customer, and has not been tampered with by third parties. Furthermore, with the TEE implementation all communications between the MPC framework enclave 210 and input data sources and output data recipients are secure due to the secure communication channels, which use, for example, SSL and/or TLS protocols.

As an additional advantage, with the provision of the input modules 211 and 214, output module 213, and the sandbox 220 including the computation function 222 and runtime support environment 224, the MPC framework enclave 210 decouples IO operations and computing functions. The MPC framework enclave 210 delegates IO operations from different data sources and to different recipients to input and output modules dedicated to respective parties in accordance with customer specifications, and never exchanges data between the respective parties. As a result, all parties can be assured that their data is not shared with other parties. Moreover, as noted herein above, the computation function 222 executes computing algorithms specified by a customer without knowing from where the input is received and to where the output will be sent. With IO operation restrictions enforced by the MPC framework enclave 210, the computation function 222 has no capability to exchange data with components outside of the MPC framework enclave 210. As a result, the computation function 222 does not execute IO operations with the parties (e.g., party 1 and party 2).

As noted above, data is decrypted prior to being sent to the computation function 222. In addition, the computation function 222 is executed with cleartext code, which is text that has not been encrypted and does not require decryption to be displayed. For example, cleartext is rendered according to American Standard Code for Information Interchange (ASCII) encoding, which can be read by a word processor or text editor. In one or more embodiments, the computation function 222 is implemented with SGX CPU hardware instructions in cleartext code and previously decrypted data (e.g., decrypted prior to being sent to the computation function 222). Accordingly, the embodiments eliminate the overhead from encryption and decryption that is present with conventional approaches using homomorphic encryption.

In illustrative embodiments, the computation function 222 runs in a CPU, which eliminates extra protocols for data exchange between different parties that are associated with secret sharing circuit protocol. As a result, by eliminating the noted technical problems associated with homomorphic encryption and secret sharing circuits, the techniques of the embodiments can be used across WANs, and therefore in cloud and/or edge computing environments.

Figure 3:
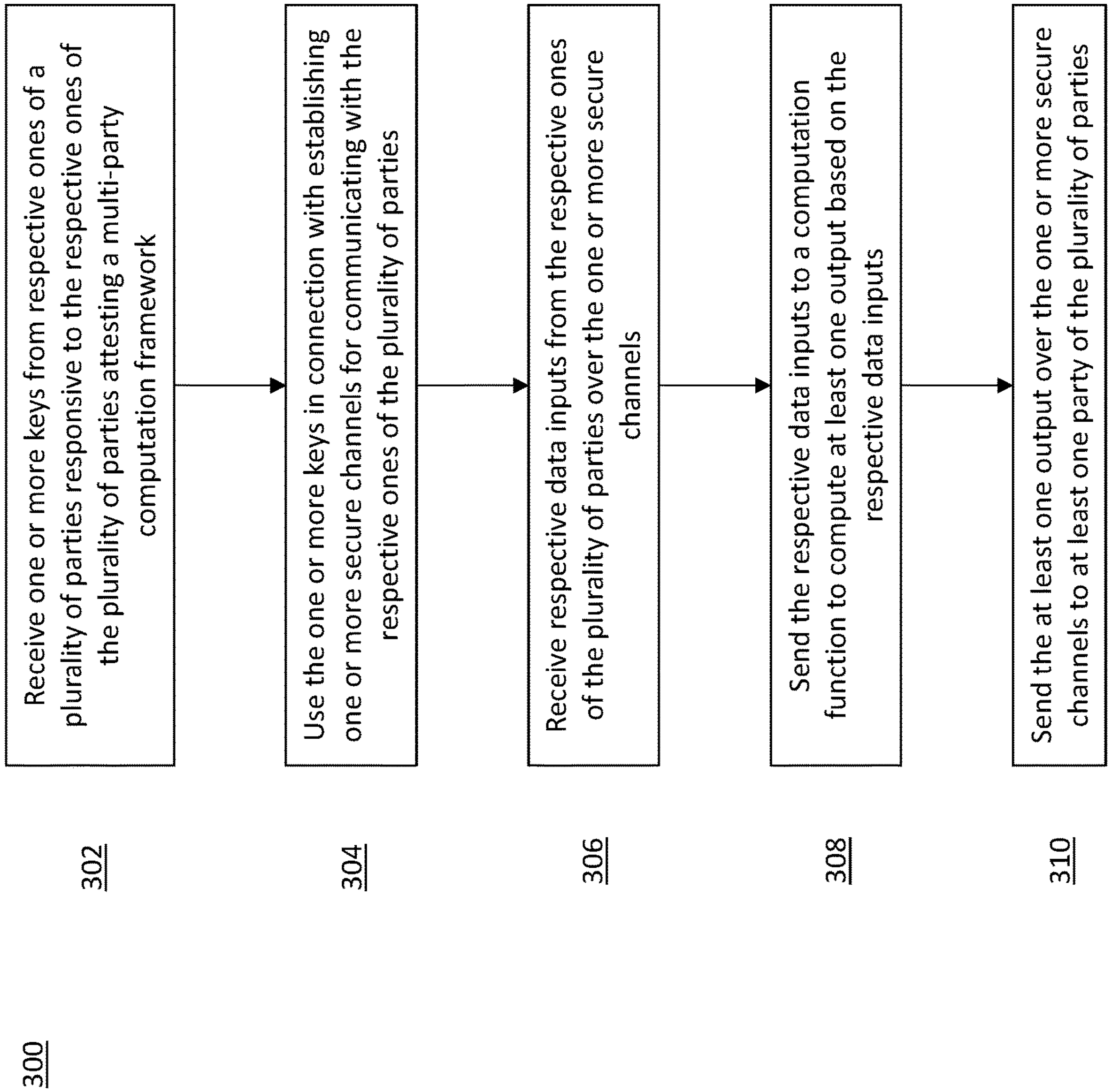
FIG. 3 illustrates a methodology for implementing operations in an MPC framework according to an illustrative embodiment according to an illustrative embodiment.

FIG. 3 illustrates a methodology 300 for implementing operations in an MPC framework according to an illustrative embodiment. With reference to FIG. 3, the methodology 300 includes steps 302 through 310, and is suitable for use in the architecture 200 but is more generally applicable to other types of architectures configured for integrating a trusted execution platform with an MPC framework.

In step 302, one or more keys (e.g., keys 203 and 204) are received from respective ones of a plurality of parties (e.g., party 1 and party 2) responsive to the respective ones of the plurality of parties attesting an MPC framework (e.g., MPC framework enclave 210). The respective ones of the plurality of parties remotely attest the multi-party computation framework (e.g., via the attestation modules 212 and 215).

In step 304, the one or more keys are used in connection with establishing one or more secure channels for communicating with the respective ones of the plurality of parties. A key corresponding to a first party of the plurality of parties is invisible to a second party of the plurality of parties. In step 306, respective data inputs are received from the respective ones of the plurality of parties over the one or more secure channels. In step 308, the respective data inputs are sent to a computation function (e.g., computation function 222) to compute at least one output based on the respective data inputs. The computation function computes the at least one output without knowing a source of the respective data inputs and a recipient of the at least one output.

In step 310, the at least one output is sent over the one or more secure channels to at least one party of the plurality of parties. The respective data inputs from the respective ones of the plurality of parties are decrypted prior to sending the respective data inputs to the computation function, and the at least one output is encrypted prior to sending the at least one output to the at least one party. According to one or more embodiments, respective input components corresponding to the respective ones of the plurality of parties are generated to receive the respective data inputs, and at least one output component corresponding to the at least one party is generated to send the at least one output over the one or more secure channels. The computation function is restricted from performing data input-output operations, wherein the respective input components and the at least one output component perform the data input-output operations.

In illustrative embodiments, the MPC framework comprises one or more enclaves, and the computation function is executed in the one or more enclaves. One or more configuration settings are received from an application outside of the one or more enclaves (e.g., MPC framework application 205). The one or more configuration settings comprise, for example, an identification of one or more locations from where the respective ones of the plurality of parties will attest the multi-party computation framework, and an identification of which of the plurality of parties will provide the respective data inputs, and which of the plurality of parties will receive the at least one output. The one or more enclaves are generated based, at least in part, on the one or more configuration settings. In addition, the application outside of the one or more enclaves initiates a process for the plurality of parties to attest the MPC framework.

The particular processing operations and other system functionality described in conjunction with the flow diagram of FIG. 3 are presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 3 can be implemented at least in part in the form of one or more software programs stored in memory and executed by a processor of a processing device such as a computer or server.

Advantageously, as explained herein in detail, illustrative embodiments provide an effective MPC framework implementation based on TEE that uses TEE instead of MPC software protocols to simulate a trusted third party (TTP). Such a solution is more direct and effective than MPC protocol. Further, illustrative embodiments avoid the overhead from encryption and decryption that is associated with homomorphic encryption, and avoid the extra protocols for data exchange that are used with secret sharing circuits.

As an additional advantage, the framework of the embodiments adaptable to multiple types of applications (e.g., database accessing applications, out-source computing applications, etc.) and to multiple types of computing environments (C, Java, Python, Javascript, etc.) by integrating different types of runtime support into the enclave. Moreover, the building of the framework is can be completely automated and hence is easy to use for customers with limited expertise. For example, a customer need only to define the configuration settings and provide a computation function via one or more user interfaces, and the framework will automatically generate the enclaves including input, output and attestation modules and a sandbox comprising the computation function.

Figure 4:
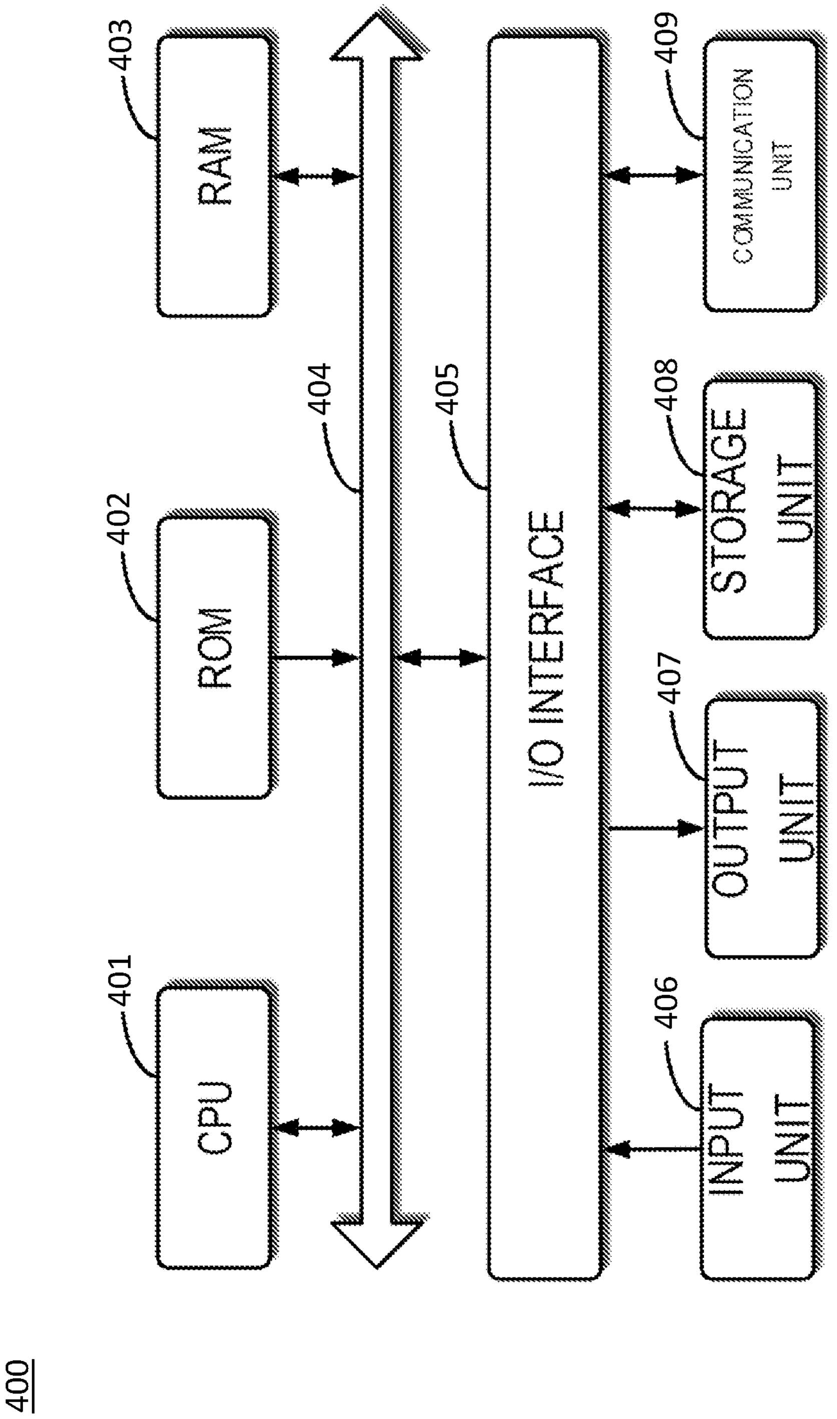
FIG. 4 illustrates a processing platform used to implement an information processing system with execution environment functionalities according to an illustrative embodiment.

FIG. 4 illustrates a block diagram of an example processing device or, more generally, an information processing system 400 that can be used to implement illustrative embodiments. For example, one or more components in FIGS. 1-3 can comprise a processing configuration such as that shown in FIG. 4 to perform steps described herein. Note that while the components of system 400 are shown in FIG. 4 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 400 can include multiple processing devices, each of which comprise the components shown in FIG. 4.

As shown, the system 400 includes a central processing unit (CPU) 401 which performs various appropriate acts and processing, based on a computer program instruction stored in a read-only memory (ROM) 402 or a computer program instruction loaded from a storage unit 408 to a random access memory (RAM) 403. The RAM 403 stores therein various programs and data required for operations of the system 400. The CPU 401, the ROM 402 and the RAM 403 are connected via a bus 404 with one another. An input/output (I/O) interface 405 is also connected to the bus 404. It is to be appreciated that component 401 in FIG. 4 can alternatively or additionally represent an accelerator such as, but not limited to, a Tensor Processing Unit (TPU), a graphics processing unit (GPU), and combinations thereof.

The following components in the system 400 are connected to the I/O interface 405, comprising: an input unit 406 such as a keyboard, a mouse and the like; an output unit 407 including various kinds of displays and a loudspeaker, etc.; a storage unit 408 including a magnetic disk, an optical disk, and etc.; a communication unit 409 including a network card, a modem, and a wireless communication transceiver, etc. The communication unit 409 allows the system 400 to exchange information/data with other devices through a computer network such as the Internet and/or various kinds of telecommunications networks.

Various processes and processing described above may be executed by the CPU 401. For example, in some embodiments, methodologies described herein may be implemented as a computer software program that is tangibly included in a machine readable medium, e.g., the storage unit 408. In some embodiments, part or all of the computer programs may be loaded and/or mounted onto the system 400 via ROM 402 and/or communication unit 409. When the computer program is loaded to the RAM 403 and executed by the CPU 401, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving configuration settings and a specification of a computation function from an application;

generating an enclave based on the configuration settings and the specification of the computation function to execute the computation function, wherein the generated enclave comprises an attestation module for each party of a plurality of parties and an input module for each party of the plurality of parties such that the generated enclave comprises a plurality of attestation modules and a plurality of input modules;

receiving a plurality of keys from the plurality of parties, wherein respective ones of the plurality of keys correspond to respective ones of the plurality of parties;

using the respective ones of the plurality of keys in connection with establishing one or more secure channels for communicating with each of the respective ones of the plurality of parties;

separately receiving respective data inputs from each of the respective ones of the plurality of parties over the one or more secure channels;

sending the respective data inputs to the computation function in the generated enclave to compute at least one output based on the respective data inputs; and sending the at least one output over the one or more secure channels to at least one party of the plurality of parties determined by the specification of the computation function;

wherein the configuration settings comprise (i) an identification of one or more locations from where the respective ones of the plurality of parties will attest a multi-party computation framework, and (ii) an identification of which of the respective ones of the plurality of parties will provide the respective data inputs and which of the respective ones of the plurality of parties will receive the at least one output;

wherein the specification comprises data types and data sizes of the respective data inputs and the at least one output; and wherein the method is performed by the multi-party computation framework comprising at least one processor coupled to at least one memory.

2. The method of claim 1, further comprising:

decrypting the respective data inputs from the respective ones of the plurality of parties prior to sending the respective data inputs to the computation function; and encrypting the at least one output prior to sending the at least one output to the at least one party.

3. The method of claim 1, wherein the plurality of keys are received in response to the respective ones of the plurality of parties remotely attesting the multi-party computation framework.

4. The method of claim 1, wherein the multi-party computation framework comprises one or more enclaves, including the generated enclave.

5. The method of claim 4, wherein the configuration settings are provided by a given party of the plurality of parties and the application is outside of the one or more enclaves.

6. The method of claim 4, further comprising generating each of the one or more enclaves based, at least in part, on the configuration settings.

7. The method of claim 5, wherein the application outside of the one or more enclaves initiates a process for the respective ones of the plurality of parties to attest the multi-party computation framework.

8. The method of claim 4, wherein the computation function is executed in the generated enclave.

9. The method of claim 1, further comprising:

generating respective input components corresponding to the respective ones of the plurality of parties to receive the respective data inputs; and generating at least one output component corresponding to the at least one party to send the at least one output over the one or more secure channels.

10. The method of claim 9, further comprising restricting the computation function from performing data input-output operations, wherein the respective input components and the at least one output component perform the data input-output operations.

11. The method of claim 1, further comprising generating respective attestation components corresponding to the respective ones of the plurality of parties to process remote attestations of the multi-party computation framework from the respective ones of plurality of parties.

12. The method of claim 1, wherein a key corresponding to a first party of the plurality of parties is invisible to a second party of the plurality of parties.

13. The method of claim 1, wherein the computation function computes the at least one output without knowing a source of the respective data inputs and a recipient of the at least one output.

14. A system, comprising:

a multi-party computation framework comprising at least one processor and at least one memory in one or more enclaves, the at least one processor being configured to:

receive configuration settings and a specification of a computation function from an application;

generate an enclave based on the configuration settings and the specification of the computation function to execute the computation function, wherein the generated enclave comprises an attestation module for each party of a plurality of parties and an input module for each party of the plurality of parties such that the generated enclave comprises a plurality of attestation modules and a plurality of input modules;

receive a plurality of keys from the plurality of parties, wherein respective ones of the plurality of keys correspond to respective ones of the plurality of parties;

use the respective ones of the plurality of keys in connection with establishing one or more secure channels for communicating with each of the respective ones of the plurality of parties;

separately receive respective data inputs from each of the respective ones of the plurality of parties over the one or more secure channels;

send the respective data inputs to the computation function in the generated enclave to compute at least one output based on the respective data inputs; and send the at least one output over the one or more secure channels to at least one party of the plurality of parties determined by the specification of the computation function;

wherein the configuration settings comprise (i) an identification of one or more locations from where the respective ones of the plurality of parties will attest the multi-party computation framework, and (ii) an identification of which of the respective ones of the plurality of parties will provide the respective data inputs and which of the respective ones of the plurality of parties will receive the at least one output; and wherein the specification comprises data types and data sizes of the respective data inputs and the at least one output.

15. The system of claim 14, wherein the at least one processor is further configured to:

decrypt the respective data inputs from the respective ones of the plurality of parties prior to sending the respective data inputs to the computation function; and encrypt the at least one output prior to sending the at least one output to the at least one party.

16. The system of claim 14, wherein the computation function computes the at least one output without knowing a source of the respective data inputs and a recipient of the at least one output.

17. A computer program product stored on a non-transitory computer-readable medium and comprising machine executable instructions, the machine executable instructions, when executed, causing a processing device of a multi-party computation framework to:

receive configuration settings and a specification of a computation function from an application;

generate an enclave based on the configuration settings and the specification of the computation function to execute the computation function, wherein the generated enclave comprises an attestation module for each party of a plurality of parties and an input module for each party of the plurality of parties such that the generated enclave comprises a plurality of attestation modules and a plurality of input modules;

receive a plurality of keys from the plurality of parties, wherein respective ones of the plurality of keys correspond to respective ones of the plurality of parties;

use the respective ones of the plurality of keys in connection with establishing one or more secure channels for communicating with each of the respective ones of the plurality of parties;

separately receive respective data inputs from each of the respective ones of the plurality of parties over the one or more secure channels;

send the respective data inputs to the computation function in the generated enclave to compute at least one output based on the respective data inputs; and send the at least one output over the one or more secure channels to at least one party of the plurality of parties determined by the specification of the computation function;

wherein the configuration settings comprise (i) an identification of one or more locations from where the respective ones of the plurality of parties will attest the multi-party computation framework, and (ii) an identification of which of the respective ones of the plurality of parties will provide the respective data inputs and which of the respective ones of the plurality of parties will receive the at least one output; and wherein the specification comprises data types and data sizes of the respective data inputs and the at least one output.

18. The computer program product of claim 17, wherein the machine executable instructions further cause the processing device to:

decrypt the respective data inputs from the respective ones of the plurality of parties prior to sending the respective data inputs to the computation function; and encrypt the at least one output prior to sending the at least one output to the at least one party.

19. The computer program product of claim 17, wherein a key corresponding to a first party of the plurality of parties is invisible to a second party of the plurality of parties.

20. The computer program product of claim 17, wherein the computation function computes the at least one output without knowing a source of the respective data inputs and a recipient of the at least one output.

* * * * *